(12) United States Patent
Fukumatsu et al.

(10) Patent No.: US 7,749,615 B2
(45) Date of Patent: Jul. 6, 2010

(54) ORGANIC ELECTROLUMINESCENT DEVICE

(75) Inventors: Takayuki Fukumatsu, Kitakyushu (JP); Hiroshi Miyazaki, Kitakyushu (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 462 days.

(21) Appl. No.: 10/590,899

(22) PCT Filed: Mar. 4, 2005

(86) PCT No.: PCT/JP2005/003764

§ 371 (c)(1), (2), (4) Date: Jan. 4, 2007

(87) PCT Pub. No.: WO2005/089025

PCT Pub. Date: Sep. 22, 2005

(65) Prior Publication Data

US 2007/0254182 A1    Nov. 1, 2007

(30) Foreign Application Priority Data

Mar. 15, 2004 (JP) ............................. 2004-072504
Mar. 15, 2004 (JP) ............................. 2004-072505

(51) Int. Cl.
*H01L 51/54* (2006.01)

(52) U.S. Cl. ............... 428/690; 428/917; 313/504; 313/506

(58) Field of Classification Search ............... None
See application file for complete search history.

(56) References Cited

U.S. PATENT DOCUMENTS

| 6,048,631 A | 4/2000 | Takahashi et al. |
| 2004/0124769 A1 | 7/2004 | Ise et al. |

FOREIGN PATENT DOCUMENTS

| JP | 06-336586 A | 12/1994 |
| JP | 10-025472 A | 1/1998 |
| JP | 10-237439 A | 8/1998 |
| JP | 2000-200684 A | 7/2000 |
| JP | 2002-305083 A | 10/2002 |

*Primary Examiner*—Dawn Garrett
(74) *Attorney, Agent, or Firm*—Birch, Stewart, Kolasch & Birch, LLP (57) ABSTRACT

Disclosed is an organic electroluminescent device (organic EL device) which has a simple structure and utilizes phosphorescence. The organic electroluminescent device is improved in luminescent efficiency and secured of sufficient driving stability. The organic electroluminescent device includes a luminescent layer or a plurality of organic compound thin film layers containing a luminescent layer formed between a pair of electrodes. The luminescent layer contains a compound composed of an Al complex of an oxyphenylbenzoxazole which is represented by the general formula (I) below as a host material, while containing an organic metal complex including Ru, Rh, Pd, Ag, Re, Os, Ir, Pt or Au as a guest material:

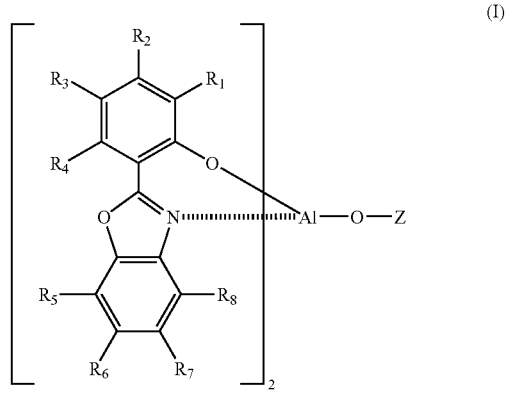

where $R_1$ to $R_8$ independently represent hydrogen atom, alkyl group, aromatic group or the like; n represents 2 or 4; and Z represents aromatic group, triarylsilyl group or the like when n is 2, while representing Al(III) when n is 4.

3 Claims, 1 Drawing Sheet

Fig.1

ORGANIC ELECTROLUMINESCENT DEVICE

TECHNICAL FIELD

The present invention relates to an organic electroluminescent device (hereinafter referred to as the "organic EL device"). More specifically, the present invention relates to a thin film type device that applies an electric field to a luminescent layer composed of an organic compound to emit light.

BACKGROUND ART

The development of an electroluminescent device using an organic material has been advanced with a view to putting the device into practical use as a high-performance flat panel having characteristics referred to as self light emission and high-speed response because a significant improvement in luminescent efficiency as compared to that of a conventional device using a single crystal of anthracene or the like has been achieved through the development of a device involving: optimizing kinds of electrodes with a view to improving the efficiency with which charge is injected from an electrode; and providing a hole-transporting layer composed of an aromatic diamine and a luminescent layer composed of an 8-hydroxyquinoline aluminum complex (hereinafter referred to as "Alq3") as thin films for a gap between electrodes.

A constitution for additionally improving the efficiency of such organic EL device is obtained by appropriately providing the above basic anode/hole-transporting layer/luminescent layer/cathode constitution with a hole-injecting layer, an electron-injecting layer, or an electron-transporting layer. Known examples of such constitution include: an anode/hole-injecting layer/hole-transporting layer/luminescent layer/cathode constitution; an anode/hole-injecting layer/luminescent layer/electron-transporting layer/cathode constitution; an anode/hole-injecting layer/luminescent layer/electron-transporting layer/electron-injecting layer/cathode constitution; and an anode/hole-injecting layer/hole-transporting layer/luminescent layer/hole-blocking layer/electron-transporting layer/cathode constitution. The hole-transporting layer has a function of transmitting a hole injected from the hole-injecting layer to the luminescent layer, and the electron-transporting layer has a function of transmitting an electron injected from the cathode to the luminescent layer. The hole-injecting layer may be referred to as an anode buffer layer as well.

In addition, the following has been known. The hole-transporting layer is interposed between the luminescent layer and the hole-injecting layer, whereby a large number of holes are injected into the luminescent layer in a reduced electric field. Furthermore, an electron injected into the luminescent layer from the cathode or from the electron-transporting layer is accumulated on an interface between the hole-transporting layer and the luminescent layer because the hole-transporting layer extremely hardly permits an electron to flow in the layer, whereby luminescent efficiency increases.

The following has also been known. The electron-transporting layer is interposed between the luminescent layer and the electron-injecting layer, whereby a large number of electrons are injected into the luminescent layer in a reduced electric field. Furthermore, a hole injected into the luminescent layer from the anode or from the hole-transporting layer is accumulated on an interface between the electron-transporting layer and the luminescent layer because the electron-transporting layer hardly permits a hole to flow in the layer, whereby luminescent efficiency increases. The development of a large number of organic materials has been heretofore advanced in association with the function of such constituent layer.

Meanwhile, each of a large number of devices including a device provided with the hole-transporting layer composed of an aromatic diamine and the luminescent layer composed of Alq3 described above has utilized fluorescent emission. It should be noted that the utilization of phosphorescent emission, that is, light emission from a triplet excited state is expected to improve efficiency by a factor of about three as compared to that of a conventional device utilizing fluorescence (singlet). Investigation has been conducted into the use of a coumarin derivative or a benzophenone derivative in a luminescent layer for this purpose, but only extremely low luminance has been obtained. After that, investigation has been conducted into the use of a europium complex as an attempt to utilize a triplet state, but the investigation has not reached light emission with high efficiency.

It has been recently reported that the use of a platinum complex (T-1, PtOEP) enables the emission of red light with high efficiency (Nature, vol. 395, p. 151, 1998). After that, doping a luminescent layer with any one of iridium complexes (T-2, Ir(ppy)3) has significantly improved the efficiency with which green light is emitted (Appl. Phys. Lett., vol. 75, p. 4, 1999). Furthermore, it has been reported that each of those iridium complexes shows extremely high luminescent efficiency even when a device structure is additionally simplified by optimizing a luminescent layer (Appl. Phys. Lett., vol. 77, p. 904, 2000).

It should be noted that chemical formulae for T-1, T-2, and the like described above have been described in the following documents, so reference should be made to the documents. In addition, structural formulae and abbreviations for a host material, a guest material, and a compound generally used in an organic layer such as a hole-injecting layer or an electron-transporting layer have also been described in the following patent documents, so reference should be made to the documents. The abbreviations used in the following description without any notation are abbreviations generally used in this technical field, and are understood as meaning the abbreviations described in the following documents and the like.

Patent Document 1: JP-A-2002-305083
Patent Document 2: JP-A-2001-313178
Patent Document 3: JP-A-2002-352957
Patent Document 4: JP-A-2000-200684
Patent Document 5: JP-A-2003-515897
Patent Document 6: JP-A-10-25472
Non Patent Document 1: Appl. Phys. Lett., 77, 904, 2000

It is a carbazole compound CBP presented in JP-A-2001-313178 that is proposed as a host material in the development of a phosphorescent organic electroluminescent device. When CBP is used as a host material for a tris(2-phenylpyridine)iridium complex (hereinafter referred to as "Ir(ppy)3") serving as a phosphorescent material capable of emitting green light, a charge injection balance is lost owing to the property of CBP with which a hole is easily allowed to flow and an electron is hardly allowed to flow. Then, an excessive amount of holes flow to an electron transportation side, with the result that the efficiency with which light is emitted from Ir(ppy)3 reduces.

A solution to the above problem is the provision of a hole-blocking layer for a gap between a luminescent layer and an electron-transporting layer. The hole-blocking layer efficiently accumulates a hole in the luminescent layer, whereby the probability of the recombination of the hole with an electron in the luminescent layer is increased, and an improvement in luminescent efficiency can be achieved. Examples of a hole-blocking material that has been generally used at present include 2,9-dimethyl-4,7-diphenyl-1,10-phenanthroline (hereinafter referred to as "BCP") and p-phenylphenolate-bis(2-methyl-8-quinolinolato-N1,O8)aluminum (hereinafter referred to as "BAlq"). Each of the materials can prevent the occurrence of the recombination of an electron and a hole in the electron-transporting layer. However, a device lifetime is extremely short because BCP is apt to crystallize even at room temperature and its reliability as a material is poor. In addition, BAlq has a Tg of about 100° C., and hence a relatively good result of a device lifetime has been reported. However, BAlq does not have any sufficient hole-blocking ability, so the efficiency with which light is emitted from Ir(ppy)3 reduces. In addition, the number of layers in a layer constitution increases by one. The increase leads to a problem in that a device structure becomes complicated and a cost increases.

In addition, JP-A-2002-305083 discloses an organic EL device using a complex $(-Ar_1-Ar_2-O-)_nM$, which is composed of a group having a nitrogen-containing heterocyclic ring Ar1 and an aromatic ring Ar2 and a metal M, as a host material that can be used instead of CBP, and a noble metal-based metal complex as a guest material in a luminescent layer. An enormous number of host materials are exemplified in the document; provided that a compound in which $Ar_1$ represents a benzoxazole ring and $Ar_2$ represents a benzene ring is exemplified as one of a large number of compounds. A compound in which M represents Zn and n represents 2 is also exemplified in the document, but the exemplification is limited to this compound. In addition, a large number of noble metal-based metal complexes each serving as a guest material are also exemplified. However, the exemplification is limited to the case where each of the metal complexes is used only in a device with a four-layer structure having a hole-blocking layer, so the document has not solved the above problems yet.

Meanwhile, 3-phenyl-4-(1'-naphthyl)-5-phenyl-1,2,4-triazole (hereinafter referred to as "TAZ") presented in JP-A-2002-352957 is also proposed as a host material for a phosphorescent organic electroluminescent device. However, a luminescent region is on the side of a hole-transporting layer owing to the property of TAZ with which an electron is easily allowed to flow and a hole is hardly allowed to flow. Therefore, depending on a material for the hole-transporting layer, the efficiency with which light is emitted from Ir(ppy)3 may reduce owing to a problem in terms of compatibility with Ir(ppy)3. For example, 4,4'-bis(N-(1-naphthyl)-N-phenylamino)biphenyl (hereinafter referred to as "NPB") that has been most frequently used in a hole-transporting layer because of its high performance, high reliability, and long lifetime has poor compatibility with Ir(ppy)3, so the material has a problem in that energy transition from Ir(ppy)3 to NPB occurs to reduce luminescent efficiency.

A solution to the above problem is the use of a material such as 4,4'-bis(N,N'-(3-tolyl)amino)-3,3'-dimethylbiphenyl (hereinafter referred to as "HMTPD") that does not cause any energy transition from Ir(ppy)3 in a hole-transporting layer.

Appl. Phys. Lett., vol. 77, p. 904, 2000 reports that light emission with high efficiency can be provided by a three-layer structure in a phosphorescent device by using: TAZ, 1,3-bis (N,N-t-butyl-phenyl)-1,3,4-oxazole (hereinafter referred to as "OXD7"), or BCP as a main material for a luminescent layer; Ir(ppy)3 as a doping material; Alq3 in an electron-transporting layer; and HMTPD in a hole-transporting layer, and that the efficiency is excellent particularly in a system using TAZ. However, HMTPD is apt to crystallize and its reliability as a material is poor because HMTPD has a Tg of about 50° C. Therefore, a device lifetime is extremely short, and the commercial application of the device is difficult. In addition, the device has a problem in that the driving voltage of the device is high.

In addition, JP-A-2000-200684 discloses an organic EL device of a luminescent material containing a complex in which two molecules of 2-(2-hydroxyphenyl)benzoxazoles and one molecule of phenols bond to one molecule of Al. An enormous number of compounds are exemplified in the document, and a combination with a dope material is also exemplified as a host material. However, the exemplification is limited to the case where fluorescent emission is utilized.

In addition, JP-A-10-25472 discloses an organic EL device of a luminescent material composed of a complex in which four molecules of oxyphenyl-benzoxazole and Al—O—Al bond to each other. An enormous number of luminescent materials are exemplified in the document, and an example concerning doping is present in the document. However, the exemplification is limited to the doping.

DISCLOSURE OF THE INVENTION

Problems to be Solved by the Invention

The application of an organic EL device to a display device such as a flat panel display requires an improvement in luminescent efficiency of the device and, at the same time, the sufficient securement of stability upon driving. The present invention has been made in view of the above current circumstances, and an object of the present invention is to provide a practically useful organic EL device that enables a simplified device constitution having high efficiency and a long lifetime.

Means for Solving the Problems

The present invention relates to an organic electroluminescent device including: organic compound thin film layers containing a luminescent layer, the organic compound thin film layers being formed between a pair of electrodes; a hole-transporting layer disposed between the luminescent layer and an anode; and an electron-transporting layer disposed between the luminescent layer and a cathode, the organic electroluminescent device having no hole-blocking layer between the electron-transporting layer and the luminescent layer, the organic electroluminescent device being characterized in that the luminescent layer contains a compound represented by the following general formula (I) as a host material and an organometal complex containing at least one metal selected from the group consisting of ruthenium, rhodium, palladium, silver, rhenium, osmium, iridium, platinum, and gold as a guest material:

where Z represents a hydrocarbon group which may have a substituent, an aromatic heterocyclic group, a triarylsilyl group, or a group represented by the following formula (II):

where $R_1$ to $R_8$ and $R_9$ to $R_{16}$ each independently represent a hydrogen atom, an alkyl group, an aralkyl group, an alkenyl group, a cyano group, an amino group, an amide group, an alkoxycarbonyl group, a carboxyl group, an alkoxy group, or an aromatic group which may have a substituent.

Here, when Z is a group represented by the formula (II), the general formula (I) is represented by the following general formula (III):

where $R_1$, to $R_{16}$ each have the same meaning as that described above.

A tris(2-phenylpyridine)iridium complex capable of emitting green phosphorescence is a preferable example of the guest material.

Hereinafter, the present invention will be described in more detail.

An organic EL device of the present invention, which relates to an organic EL device which utilizes so-called phosphorescence and in which a luminescent layer contains a compound represented by the general formula (I) and a phosphorescent organometal complex containing at least one metal selected from Groups 7 to 11 of the periodic table, has a luminescent layer containing a compound represented by the general formula (I) as a main component and an organometal complex containing at least one metal selected from ruthenium, rhodium, palladium, silver, rhenium, osmium, iridium, platinum, and gold as an accessory component.

The term "main component" as used herein refers to a component accounting for 50 wt % or more of the materials of which the layer is formed, and the term "accessory component" as used herein refers to a component accounting for less than 50 wt % of the materials of which the layer is formed. In the organic electroluminescent device of the present invention, the compound represented by the general formula (I) in the luminescent layer must basically have an excited triplet level as an energy state higher than the excited triplet level of the phosphorescent. organometal complex in the layer. In addition, the compound must be a compound which: provides a stable thin film shape and/or has a high glass transition temperature (Tg); and is capable of efficiently transporting a hole and/or an electron. Furthermore, the compound is requested to be a compound which: is electrochemically and chemically stable; and hardly generates an impurity, which serves as a trap or quenches light emission, at the time of production or of use.

Furthermore, it is also important for the compound to have a hole-injecting ability with which a luminescent region can be appropriately distant from the interface of a hole-transporting layer in order that the light emission of a phosphorescent organic complex may be hardly affected by the excited triplet level of the hole-transporting layer.

In the present invention, the compound represented by the general formula (I) is used as a host material of which a luminescent layer satisfying those conditions is formed. In the general formula (I), $R_1$ to $R_8$ each independently represent a hydrogen atom, an alkyl group, an aralkyl group, an alkenyl group, a cyano group, an amino group, an amide group, an alkoxycarbonyl group, a carboxyl group, an alkoxy group, or an aromatic group which may have a substituent. An alkyl group having 1 to 6 carbon atoms (hereinafter, referred to as a lower alkyl group) is preferably exemplified as the alkyl group. A benzyl group or a phenethyl group is preferably exemplified as the aralkyl group. A lower alkenyl group having 1 to 6 carbon atoms is preferably exemplified as the alkenyl group. An amino group represented by —$NR_2$ (R represents hydrogen or a lower alkyl group) is preferably exemplified as the amino group. An example of the amide group includes —$CONH_2$. A lower alkoxy group having 1 to 6 carbon atoms is preferably exemplified as the alkoxy of an alkoxycarbonyl group and an alkoxy group. The compound is more preferably selected from compounds in which all or 5 or more of $R_1$ to $R_8$ each represent a hydrogen atom and the rest of them each represent a lower alkyl group having less than 3 carbon atoms.

An example of the aromatic group which may have a substituent includes an aromatic hydrocarbon group or an aromatic heterocyclic group which may have a substituent. An aromatic hydrocarbon group such as a phenyl group, a naphthyl group, an acenaphthyl group, or an anthryl group is preferably exemplified as the aromatic hydrocarbon group. An aromatic heterocyclic group such as a pyridyl group, a quinolyl group, a thienyl group, a carbazole group, an indolyl group, or a furyl group is preferably exemplified as the aromatic heterocyclic group. When those groups are an aromatic hydrocarbon group or an aromatic heterocyclic group each having a substituent, examples of the substituent include: an allyloxy group such as a lower alkyl group, a lower alkoxy group, a phenoxy group, or a tolyloxy group; an arylthio group such as a phenylthio group; an aralkyloxy group such as a benzyloxy group; an aryl group such as a phenyl group, a naphthyl group, or a biphenylyl; a dimethylamino group; and a heteroaryl group.

Examples of Z include: a phenoxyphenyl group; a phenylthiophenyl group; a triarylsilyl group such as a triphenylsilyl group; an aryl group such as a phenyl group, a diphenyl group, a naphthyl group, or naphthylphenyl group; a hetero- cyclic group such as a pyrimidyl group, a pyridyl group, a thienyl group, a furyl group, an oxadiazole group, a benzoxazolyl group, or a dithienyl group; and a group represented by the formula (II). A phenoxyphenyl group, a triarylsilyl group, an aryl group, or a heterocyclic group is preferable. A phenoxyphenyl group, a triphenylsilyl group, a phenyl group, a diphenyl group, a naphthyl group or a naphthylphenyl group is more preferable. A triphenylsilyl group, a phenyl group, a diphenyl group, or a naphthylphenyl group is still more preferable. Those groups each may have a substituent, for example: a lower alkyl group such as a methyl group, an ethyl group, a propyl group, or a butyl group; a halogen atom such as a fluorine atom, a chlorine atom, or a bromine atom; an alkoxy group such as a methoxy group, an ethoxy group, or a propoxy group; a fluoroalkyl group such as a trifluoromethyl group; or a heterocyclic group such as an oxadiazole group which may have a substituent or a nitro group. Preferable substituent is a fluorine atom, a methyl group, a t-butyl group, a fluoromethyl group, a methoxy group, or an oxadiazole group which may have a substituent. More preferable substituent is a methyl group or a trifluoromethyl group. Furthermore, it is also preferable that Z be a group represented by the formula (II). When Z is a group represented by the formula (II), the general formula (I) is represented by the general formula (III). Here, examples of $R_9$ to $R_{16}$ each preferably include the same atoms or groups described for $R_1$ to $R_8$.

The compound represented by the general formula (I) or the general formula (III) is more preferably selected from compounds in which $R_1$ to $R_8$ and $R_9$ to $R_{16}$ each represent a hydrogen atom, a lower alkyl group, or a lower alkoxy group. The compound is still more preferably selected from compounds in which all or 10 or more of $R_1$ to $R_8$ and $R_9$ to $R_{16}$ each represent hydrogen, and the rest of them each represent a lower alkyl group or a lower alkoxy group.

Preferable specific examples of a compound represented by the general formula (I) or the general formula (III) are shown below. However, the examples are not limited to the following.

1

2

3

4

5

6

7

7

8

10

11

12

13

14

15

16

17

18

23

19

24

20

25

21

26

22

27

38

39

40

41

42

43

44

45

46

The Al complex compound used in the present invention and represented by the general formula (I) can be easily produced by means of a known method. For example, as shown below, the complex compound represented by the general formula (I) can be produced by: forming a complex compound represented by a general formula (a) once; and reacting the compound with a compound represented by a general formula (b):

where $R_1$ to $R_8$ and Z correspond to $R_1$, to $R_8$ and Z in the formula (I), respectively except for the case where Z is a group represented by the formula (II), and Y represents an alkoxyl group, a halogen atom, a hydroxyl group, or an ionic group.

The Al complex compound represented by the general formula (III) can be easily produced by means of a known method. For example, the compound is synthesized by a complex formation reaction between a corresponding metal salt and a compound represented by the following general formula (c). The synthesis reaction is performed by means of, for example, the method shown by Y. Kushi et al. (J. Amer.

Chem. Soc., vol. 92, p. 91, 1970). It should be noted that $R_1$ to $R_8$ in the formula (c) correspond to $R_1$ to $R_8$ in the general formula (I), respectively.

(c)

The luminescent layer contains, as a guest material, an organometal complex containing at least one metal selected from ruthenium, rhodium, palladium, silver, rhenium, osmium, iridium, platinum, and gold. The organometal complex has been known in the above patent documents and the like, and any complex can be selected from those described in the documents and can be used.

Preferable examples of the organometal complex include complexes (formula A) such as Ir(ppy)3, complexes (formula B) such as Ir(bt)2·acac3, and complexes (formula C) such as PtOEt3 each having a noble metal device such as Ir as a center metal. Specific examples of those complexes are shown below. However, the examples are not limited to the following compounds.

(A)

-continued (B)

-continued

(C)

-continued

The host material to be used in the luminescent layer in the present invention can be caused to emit light at the center of the luminescent layer because the material can cause an electron and a hole to flow nearly uniformly. Therefore, unlike TAZ, light is not emitted on a hole transportation side, and no energy transition to a hole-transporting layer occurs, so no reduction in efficiency occurs. In addition, unlike CPB, light is not emitted on the side of an electron-transporting layer, and no energy transition to the electron-transporting layer occurs, so no reduction in efficiency occurs. As a result, a highly reliable material having a track record of mass production such as NPB for use in a hole-transporting layer or Alq3 for use in an electron-transporting layer can be used.

Figure 1:
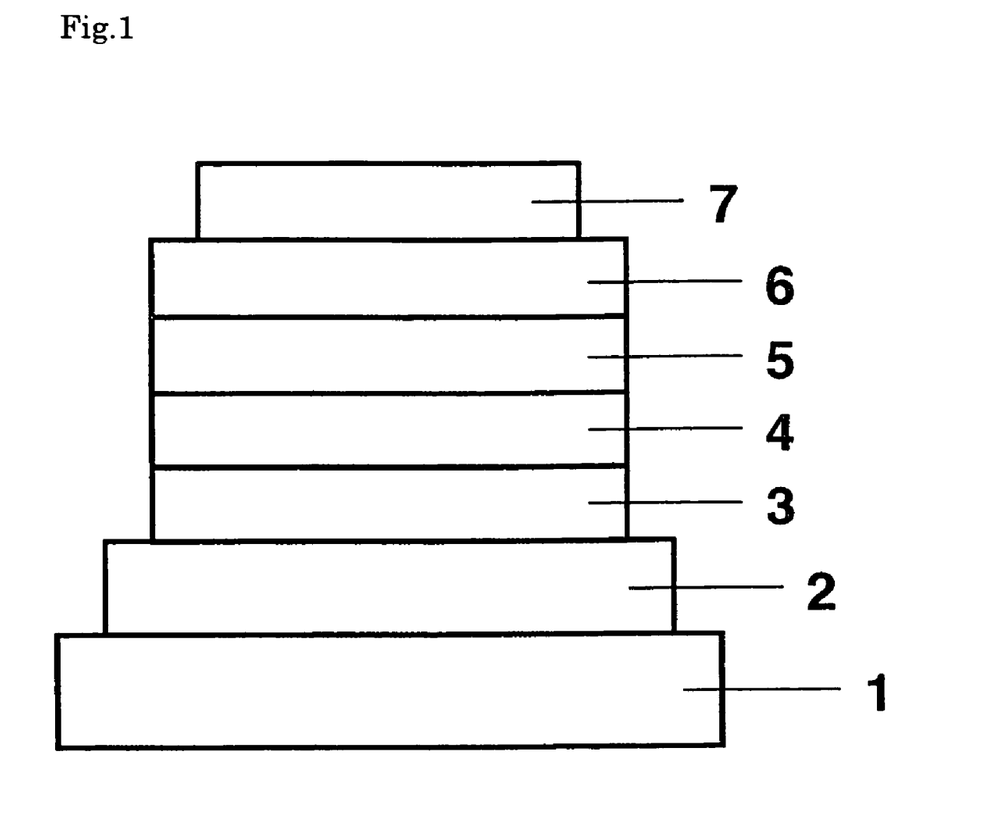
FIG. 1 is a sectional view showing an example of an organic electroluminescent device.

Hereinafter, the organic EL device of the present invention will be described with reference to the drawing. FIG. 1 is a sectional view schematically showing an example of the structure of a general organic EL device to be used in the present invention. Reference numeral 1 denotes a substrate; 2, an anode; 3, a hole-injecting layer; 4, a hole-transporting layer; 5, a luminescent layer; 6, an electron-transporting layer; and 7, a cathode. The organic EL device of the present invention has the substrate, the anode, the hole-transporting layer, the luminescent layer, the electron-transporting layer, and the cathode as essential layers. A layer except the essential layers such as the hole-injecting layer can be omitted, and any other layer may be provided as required. The organic EL device of the present invention is not provided with any hole-blocking layer, so its layer structure is simplified. The simplification provides advantages in terms of production and performance.

The substrate 1 serves as a support for the organic electroluminescent device, and a quartz or glass plate, a metal plate or a metal foil, a plastic film or sheet, or the like is used as the substrate. A glass plate, or a plate made of a transparent synthetic resin such as polyester, polymethacrylate, polycarbonate, or polysulfone is particularly preferable. Attention must be paid to gas barrier property when a synthetic resin substrate is used. Excessively small gas barrier property of the substrate is not preferable because external air that has passed the substrate may deteriorate the organic electroluminescent device. Accordingly, a method involving providing at least one surface of the synthetic resin substrate with, for example, a dense silicon oxide film to secure gas barrier property is also one of the preferable methods.

The anode 2, which is provided on the substrate 1, serves to inject a hole into the hole-transporting layer. The anode is ordinarily constituted by, for example, any one of: metals such as aluminum, gold, silver, nickel, palladium, and platinum; metal oxides such as oxides of indium and/or tin; metal halides such as copper iodide; carbon black; and conductive polymers such as poly(3-methylthiophene), polypyrrole, and polyaniline. The anode is ordinarily formed by means of, for example, a sputtering method or a vacuum deposition method in many cases. In addition, in the case of, for example, metal fine particles made of silver or the like, fine particles made of copper iodide or the like, carbon black, conductive metal oxide fine particles, or a conductive polymer fine powder, the anode 2 can be formed by: dispersing such fine particles or fine powder into an appropriate binder resin solution; and applying the dispersion liquid to the substrate 1. Furthermore, in the case of a conductive polymer, the anode 2 can be formed by directly forming a thin film on the substrate 1 by means of electrolytic polymerization or by applying the conductive polymer to the substrate 1. The anode can be formed by laminating different substances. The thickness of the anode varies depending on required transparency. When transparency is needed, the transmittance of visible light is desirably 60% or more in ordinary cases, or preferably 80% or more. In this case, the thickness is ordinarily 5 to 1,000 nm, or preferably about 10 to 500 nm. When the anode may be opaque, the anode 2 may be identical to the substrate 1. Furthermore, a different conductive material can be laminated on the anode 2 described above.

The hole-transporting layer 4 is provided on the anode 2. The hole-injecting layer 3 may be provided for a gap between them. Conditions required for a material for the hole-transporting layer are as follows: the material must have high efficiency with which a hole is injected from the anode and be capable of efficiently transporting the injected hole. To this end, the material is requested to: have a small ionization potential, high transparency for visible light, and a large hole mobility; be excellent in stability; and hardly generate an impurity, which serves as a trap, at the time of production or of use. In addition, the layer 4 is requested to neither quench light emitted from the luminescent layer 5 nor form an exciplex between itself and the luminescent layer to reduce efficiency because the layer contacts with the luminescent layer. When application for on-vehicle display is taken into consideration, the device is additionally requested to satisfy heat resistance in addition to the above general requirements. Therefore, a material having a value for Tg of 85° C. or higher is desirable.

A known triarylamine dimer such as NPB described above can be used as a hole-transporting material in the organic EL device of the present invention.

It should be noted that a known compound can be used as another hole-transporting material in combination with the triarylamine dimer as required. Examples of such compound include: an aromatic diamine which has two or more tertiary amines and in which nitrogen atoms are substituted by two or more fused aromatic rings; an aromatic amine compound having a star burst structure such as 4,4',4'-tris(1-naphthylphenylamino)triphenylamine; an aromatic amine compound composed of a triphenylamine tetramer; and a Spiro compound such as 2,2',7,7'-tetrakis-(diphenylamino)-9,9'-spirobifluorene. One kind of those compounds may be used alone, or two or more kinds of them may be used as a mixture as required.

In addition to the above compounds, examples of a material for the hole-transporting layer include polymer materials such as polyvinyl carbazole, polyvinyl triphenylamine, and polyarylene ether sulfone containing tetraphenylbenzidine.

When the hole-transporting layer 4 is formed by means of an application method, the hole-transporting layer is formed by: adding and dissolving one or two or more kinds of hole-transporting materials, and, as required, an additive that does not serve as a trap for a hole such as a binder resin or an application property improver to prepare an application solution; applying the solution to the anode 2 by means of a method such as a spin coating method; and drying the applied solution. Examples of the binder resin include polycarbonate, polyallylate, and polyester. The amount of the binder resin to be added is desirably small because a large amount of the binder resin to be added reduces a hole mobility. The amount is preferably 50 wt % or less in ordinary cases.

When the hole-transporting layer 4 is formed by means of a vacuum deposition method, the layer is formed on the substrate, which is placed so as to be opposite to a crucible placed in a vacuum chamber and on which. the anode has been formed, by: loading a hole-transporting material into the crucible; evacuating the vacuum chamber by using an appropriate vacuum pump to about $10^{-4}$ Pa; and heating the crucible to evaporate the hole-transporting material. The thickness of the hole-transporting layer 4 is ordinarily 5 to 300 nm, or preferably 10 to 100 nm. In general, a vacuum deposition method is often employed for uniformly forming a thin film as described above.

The luminescent layer 5 is provided on the hole-transporting layer 4. The luminescent layer 5 contains the compound represented by the general formula (I) and the organometal complex containing a metal selected from Groups 7 to 11 of the periodic table described above. The layer is excited by the recombination of a hole injected from the anode to move in the hole-transporting layer and an electron injected from the cathode to move in the electron-transporting layer 6 between electrodes to which an electric field is applied, thereby showing strong light emission. It should be noted that the luminescent layer 5 may contain another component such as another host material, guest material, or fluorescent dye to the extent that the performance of the present invention is not impaired.

The content of the organometal complex in the luminescent layer is preferably in the range of 0.1 to 30 wt %. A content of 0.1 wt % or less cannot contribute to an improvement in luminescent efficiency of the device. A content in excess of 30 wt % causes concentration quenching such as the formation of a dimer by organometal complexes, thereby leading to a reduction in luminescent efficiency. There is a tendency in that, in a conventional device utilizing fluorescence (singlet), the amount of an organometal complex in the luminescent layer is preferably slightly larger than that of a fluorescent dye (dopant) in the luminescent layer. The organometal complex may be partially incorporated, or nonuniformly distributed, in the thickness direction of the luminescent layer.

The thickness of the luminescent layer 5 is ordinarily 10 to 200 nm, or preferably 20 to 100 nm. The layer is formed into a thin film in the same manner as in the hole-transporting layer 4.

The electron-transporting layer 6 is provided for a gap between the luminescent layer 5 and the cathode 7 with a view to additionally improving the luminescent efficiency of the device. It is preferable that: no hole-blocking layer be provided for a gap between the luminescent layer 5 and the electron-transporting layer 6; and the luminescent layer 5 be provided for a gap between the hole-transporting layer 4 and the electron-transporting layer 6 to contact with both layers. The electron-transporting layer 6 is formed of a compound capable of efficiently transporting an electron injected from the cathode toward the luminescent layer 5 between electrodes to which an electric field is applied. An electron transportable compound to be used in the electron-transporting layer 6 must be a compound which: has high efficiency with which an electron is injected from the cathode 7 and a high electron mobility; and is capable of efficiently transporting an injected electron.

Examples of an electron-transporting material satisfying such conditions include: a metal complex such as Alq3; a metal complex of 10-hydroxybenzo[h]quinoline; an oxadiazole derivative; a distyrylbiphenyl derivative; a silol derivative; a 3- or 5-hydroxyflavone metal complex; a benzoxazole metal complex; a benzothiazole metal complex; trisbenzimidazolylbenzene; a quinoxaline compound; a phenanthroline derivative; 2-t-butyl-9,10-N,N'-dicyanoanthraquinonezimine; n-type hydrogenated amorphous silicon carbide; n-type zinc sulfide; and n-type zinc selenide. The thickness of the electron-transporting layer 6 is ordinarily 5 to 200 nm, or preferably 10 to 100 nm.

The electron-transporting layer 6 is formed through lamination on the luminescent layer 5 by means of an application method or a vacuum deposition method as in the case of the hole-transporting layer 4. A vacuum deposition method is ordinarily used.

An attempt has also been made to insert the hole-injecting layer 3 into a gap between the hole-transporting layer 4 and the anode 2 for the purposes of additionally improving the efficiency with which a hole is injected and improving the adhesive force of the entire organic layers to the anode. The insertion of the hole-injecting layer 3 has a reducing effect on the initial driving voltage of the device and, at the same time, a suppressing effect on an increase in voltage upon continuous driving of the device at a constant current. Conditions required for a material to be used in the hole-injecting layer are as follows: the material must be able to form a uniform thin film capable of contacting with the anode well, and must be thermally stable, that is, must have a high melting point and a high glass transition temperature. The material is requested to have a melting point of 300° C. or higher and a glass transition temperature of 100° C. or higher. Furthermore, examples of the requirements for the material include: a low ionization potential; the ease with which a hole is injected from the anode; and a large hole mobility.

To this end, phthalocyanine compounds such as copper phthalocyanine, organic compounds such as polyaniline and polythiophene, sputtered carbon films, and metal oxides such as a vanadium oxide, a ruthenium oxide, and a molybdenum oxide have been heretofore reported. Even the hole-injecting layer can be formed into a thin film in the same manner as in the hole-transporting layer; provided that, in the case of an inorganic substance, a sputtering method, an electron beam deposition method, or a plasma CVD method is additionally employed. The thickness of the anode buffer layer 3 thus formed is ordinarily 3 to 100 nm, or preferably 5 to 50 nm.

The cathode 7 serves to inject an electron into the luminescent layer 5. A material to be used in the anode 2 can be used in the cathode; provided that a metal having a low work function is preferable for the efficient injection of an electron, and any one of appropriate metals such as tin, magnesium, indium, calcium, aluminum, and silver, and alloys of the metals is used. Specific examples of the cathode include alloy electrodes each having a low work function and each made of a magnesium-silver alloy, a magnesium-indium alloy, an aluminum-lithium alloy, or the like.

The thickness of the cathode 7 is ordinarily similar to that of the anode 2. Additionally laminating a metal layer which has a high work function and which is stable against the atmosphere on the cathode made of a metal having a low work function with a view to protecting the cathode improves the stability of the device. To this end, a metal such as aluminum, silver, copper, nickel, chromium, gold, or platinum is used.

Furthermore, inserting an extremely thin insulating film (0.1 to 5 nm) made of LiF, $MgF_2$, $Li_2O$, or the like as an electron-injecting layer into a gap between the cathode and the electron-transporting layer is also an effective method of improving the efficiency of the device.

It should be noted that a structure reverse to that shown in FIG. 1 is also permitted. That is, the cathode 7, the electron-transporting layer 6, the luminescent layer 5, the hole-transporting layer 4, and the anode 2 can be laminated in the stated order on the substrate 1. As described above, the organic EL device of the present invention can be provided for a gap between two substrates at least one of which has high transparency. In this case as well, a layer can be added or omitted as required.

The present invention is applicable to any one of: the case where an organic EL device is a single device; the case where the devices of this kind are arranged in an array fashion; and the case where the device has a structure in which an anode and a cathode are arranged in an X-Y matrix fashion. The organic EL device of the present invention has high luminescent efficiency and significantly improved driving stability as compared to those of a conventional device utilizing light emission from a singlet state because a compound having a specific skeleton and a phosphorescent metal complex are incorporated into the luminescent layer. In addition, the device can exert excellent performance when it is applied to a full-color or multi-color panel.

BEST MODE FOR CARRYING OUT THE INVENTION

Next, the present invention will be described in more detail by way of synthesis examples and examples. However, the present invention is not limited to the following description of examples without departing from its gist.

SYNTHESIS EXAMPLE 1

5.0 g of aluminum triisopropoxide and 10.3 g of 2-(2-hydroxyphenyl)benzoxazole were loaded into a 500-ml three-necked flask that had been deaerated and replaced with nitrogen. 100 ml of anhydrous toluene were added to the mixture for dissolution. After that, the temperature of the solution was heated to 60° C., and then the solution was stirred for 30 minutes. 100 ml of anhydrous toluene into which 4.2 g of p-phenylphenol had been dissolved were slowly dropped to the solution, and the whole without any change was stirred at 60° C. for 4 hours. After the temperature of the resultant had been cooled to room temperature, the resultant white precipitate was filtered out, and was washed with toluene and ethanol in the stated order. The precipitate was dried under reduced pressure, whereby 6.6 g of a white powder were obtained. The compound is referred to as Compound 12 because it corresponds to the above-exemplified compound represented by the general formula (1) and having a compound number of 12. Part of Compound 12 was subjected to sublimation purification before it was used in the production of a device.

SYNTHESIS EXAMPLE 2

9.8 g of aluminum triisopropoxide and 20.3 g of 2-(2-hydroxyphenyl)benzoxazole were loaded into a 1,000-ml three-necked flask. 480 ml of 2-propanol were added to the mixture, and the whole was refluxed for 4 hours. After that, 0.9 ml of pure water was added to the resultant, and the whole was refluxed for an additional 2 hours. After the temperature of the resultant had been cooled to room temperature, the resultant white precipitate was filtered out, and was washed with 2-propanol. The precipitate was dried under reduced pressure, whereby 23.5 g of a white powder were obtained. The resultant compound is Compound 33. Part of Compound 33 was subjected to sublimation purification before it was used in the production of a device.

REFERENCE EXAMPLE 1

Compound 12, Compound 33, TAZ, or Alq3 was deposited from the vapor onto a glass substrate by means of a vacuum deposition method at a degree of vacuum of $4.0 \times 10^{-4}$ Pa and a deposition rate of 1.0 Å/sec to form a thin film having a thickness of 100 nm. Investigation into the stability of the thin film was conducted by: leaving the resultant in the atmosphere at room temperature; and measuring the time for the thin film to crystallize. Table 1 shows the results.

TABLE 1

|  | Number of days to crystallization |
| --- | --- |
| TAZ | below 2~3 days |
| compound 12 | above 30 days |
| compound 33 | above 30 days |
| Alq3 | above 30 days |

REFERENCE EXAMPLE 2

Only a luminescent layer was deposited from the vapor onto a glass substrate, and investigation as to whether the resultant was adaptable to a host material for Ir(ppy)3 was conducted.

Compound 12 or 33, and Ir(ppy)3 were deposited from the vapor from different deposition sources onto a glass substrate by means of a vacuum deposition method under the condition of a degree of vacuum of $4.0 \times 10^{-4}$ Pa, whereby a thin film having an Ir(ppy)3 concentration of 7.0% and a thickness of 50 nm was formed at 1.0 Å/sec. In addition, a thin film was produced in the same manner as the foregoing except that thin film main components were changed to TAZ, Alq3, and bis(2-methyl-8-hydroxyquinolinolato)aluminum (III)-µ-oxo-bis(2-methyl-8-hydroxyquinolinolato)aluminum (III) (hereinafter referred to as "(Almq2)2O").

The produced thin film was evaluated by using a fluorometer. An excitation wavelength was the local maximum absorption wavelength of Compound 12, Compound 33, TAZ, BAlq, Alq3, or (Almq2)2O, and light emitted at the wavelength was observed. Table 2 shows the results.

TABLE 2

|  | Light emission from host | Light emission from guest |
| --- | --- | --- |
| TAZ | X | ○ |
| Compound 12 | X | ○ |
| Compound 33 | X | ○ |
| BAlq | X | X |
| Alq3 | ○ | X |
| (Almq2) 2O | X | X |

The following has been found. When TAZ, or Compound 12 or 33 is used as a main material for a luminescent layer, energy transition to Ir(ppy)3 occurs, whereby phosphorescence occurs. When Alq3 is used, no energy transition to Ir(ppy)3 occurs, and Alq3 itself causes fluorescence.

In addition, in the case of BAlq or (Almq2)2O, neither a host nor a guest emits light. In view of the foregoing, the inventors consider the following. Although the transition of energy to a guest occurs once, the re-transition of the energy to a host occurs owing to the inappropriate triplet energy level of the host, thereby leading to heat inactivation through a nonradiative process.

Therefore, when a phosphorescent guest is used, a host having a singlet or triplet energy level appropriate for the guest to be used is desirably used.

EXAMPLE 1

An organic EL device having a constitution obtained by omitting a hole-injecting layer from the constitution shown in FIG. 1 and adding an electron-injecting layer to the constitution was produced. Each thin film was laminated by means of a vacuum deposition method at a degree of vacuum of $4.0 \times 10^{-4}$ Pa on a glass substrate on which an anode having a thickness of 150 nm and composed of ITO had been formed. First, NPB was formed into a hole-transporting layer having a thickness of 60 nm on ITO at a deposition rate of 1.0 Å/sec.

Next, Compound 12 and Ir(ppy)3 were co-deposited from the vapor from different deposition sources onto the hole-transporting layer at a deposition rate of 1.0 Å/sec, whereby a luminescent layer having a thickness of 25 nm was formed. At this time, . Next, Alq3 was formed into an electron-transporting layer having a thickness of 50 nm at a deposition rate of 1.0 Å/sec. Furthermore, lithium fluoride (LiF) was formed into an electron-injecting layer having a thickness of 0.5 nm on the electron-transporting layer at a deposition rate of 0.5 Å/sec. Finally, aluminum (Al) was formed into an electrode having a thickness of 170 nm on the electron-injecting layer at a deposition rate of 15 Å/sec, whereby the organic EL device was produced.

EXAMPLE 2

An organic EL device was produced in the same manner as in Example 1 except that Compound 33 and Ir(ppy)3 were co-deposited from the vapor from different deposition sources onto the hole-transporting layer at a deposition rate of 1.0 Å/sec in such a manner that an Ir(ppy)3 concentration would be 7.0%, to form a luminescent layer having a thickness of 25 nm.

An external power source was connected to each of the organic EL devices obtained in Examples 1 and 2, and a direct voltage was applied to each of the devices. As a result, it was confirmed that each of the devices had light emission properties shown in Table 3. Luminance, a voltage, and luminescent efficiency shown in Table 3 are values at 10 mA/cm². It was found that the local maximum wavelength of a device emission spectrum was 517 nm and light emission from Ir(ppy)3 was obtained.

COMPARATIVE EXAMPLE 1

An organic EL device was produced in the same manner as in Example 1 except that: HMTPD was used in a hole-transporting layer; and TAZ was used as a main component of a luminescent layer.

COMPARATIVE EXAMPLE 2

An organic EL device was produced in the same manner as in Example 1 except that TAZ was used as a main component of a luminescent layer. The device was evaluated in the same manner as in Example 1. Table 3 summarizes the results of the evaluation.

TABLE 3

|  | Luminance (cd/m²) | Voltage (V) | Visual luminescent efficiency (1 m/W) |
| --- | --- | --- | --- |
| Example 1 | 2279 | 8.9 | 8.1 |
| Example 2 | 2279 | 9.0 | 8.0 |
| Comp. Ex. 1 | 2050 | 13.2 | 4.9 |
| Comp. Ex. 2 | 1270 | 9.5 | 4.2 |

INDUSTRIAL APPLICABILITY

According to the present invention, there can be provided an organic electroluminescent device which: can emit light with high luminance and high efficiency at a low voltage; and hardly deteriorates upon high-temperature storage. Therefore, potential applications of the organic electroluminescent device according to the present invention include: a flat panel display (such as a display for an OA computer or a wall hanging television); an on-vehicle display device; a portable phone display; a light source utilizing the characteristics of the device as a planar emitter (such as a light source for a copying machine or a backlight source for any one of liquid crystal displays and meters); a display board; and a marker lamp. Accordingly, the technical value of the device is large.

The invention claimed is:

1. An organic electroluminescent device, comprising:
organic compound thin film layers including a luminescent layer, the organic compound thin film layers being formed between a pair of electrodes;
a hole-transporting layer disposed between the luminescent layer and an anode; and
an electron-transporting layer disposed between the luminescent layer and a cathode,
the organic electroluminescent device having no hole-blocking layer between the electron-transporting layer and the luminescent layer,
the organic electroluminescent device being characterized in that the luminescent layer contains a compound represented by the following general formula (III) as a host material and an organometal complex containing at least one metal selected from the group consisting of iridium, as a guest material:

where $R_1$ to $R_{16}$ each independently represent hydrogen atom, alkyl group, aralkyl group, alkenyl group, cyano group, amino group, amide group, alkoxycarbonyl group, carboxyl group, alkoxy group, or aromatic group which may have a substituent.

2. The organic electroluminescent device according to claim 1, wherein the guest material comprises tris(2-phenylpyridine)iridium complex capable of emitting green phosphorescence.

3. The organic electroluminescent device according to claim 1, wherein the luminescent layer emits light via phosphorescence and the organometal complex is a phosphorescent organometal complex.

* * * * *